United States Patent
Pfitzenmaier et al.

(10) Patent No.: US 9,640,873 B2
(45) Date of Patent: May 2, 2017

(54) RADAR DEVICE FOR A MOTOR VEHICLE, SECURING DEVICE FOR A RADAR APPARATUS AND METHOD FOR MANUFACTURING AN ABSORPTION ELEMENT FOR A RADAR APPARATUS

(71) Applicant: VALEO Schalter und Sensoren GmbH, Bietigheim-Bissingen (DE)

(72) Inventors: Patrick Pfitzenmaier, Besigheim (DE); Frank Sickinger, Weissach (DE)

(73) Assignee: VALEO Schalter und Sensoren GmbH, Bietigheim-Bissingen (DE)

(*) Notice: Subject to any disclaimer, the term of this patent is extended or adjusted under 35 U.S.C. 154(b) by 338 days.

(21) Appl. No.: 14/366,694

(22) PCT Filed: Nov. 28, 2012

(86) PCT No.: PCT/EP2012/073817
§ 371 (c)(1),
(2) Date: Jun. 19, 2014

(87) PCT Pub. No.: WO2013/092143
PCT Pub. Date: Jun. 27, 2013

(65) Prior Publication Data
US 2014/0375490 A1    Dec. 25, 2014

(30) Foreign Application Priority Data
Dec. 23, 2011    (DE) .................. 10 2011 122 346

(51) Int. Cl.
*H01Q 17/00* (2006.01)
*G01S 13/93* (2006.01)
(Continued)

(52) U.S. Cl.
CPC ....... *H01Q 17/001* (2013.01); *B29C 45/0001* (2013.01); *G01S 7/032* (2013.01);
(Continued)

(58) Field of Classification Search
CPC ..... G01Q 17/00–17/008; G01Q 1/3233; G01S 7/32; G01S 13/931; G01S 2007/027
(Continued)

(56) References Cited

U.S. PATENT DOCUMENTS 4,748,449 A * 5/1988 Landers, Jr. ........... H01Q 17/00
342/1
5,438,333 A * 8/1995 Perkins ................ H01Q 17/001
342/4
(Continued)

FOREIGN PATENT DOCUMENTS

DE      197 07 585 A1    9/1998
DE  10 2004 033 760 A1    2/2006
(Continued)

OTHER PUBLICATIONS

International Search Report for corresponding International Application No. PCT/EP2012/073817, mailed Mar. 27, 2013 (3 pages).
(Continued)

*Primary Examiner* — Peter Bythrow
(74) *Attorney, Agent, or Firm* — Osha Liang LLP

(57) ABSTRACT

The invention relates to a radar device (1) for a motor vehicle, having a radar apparatus (2) for emitting and receiving electromagnetic waves (4) and having at least one absorption element (9, 100), which is formed from an absorption material which absorbs the electromagnetic waves (4), wherein the at least one absorption element (9, 100) is embodied as an element which is separate from a housing (3) of the radar apparatus (2) and is arranged outside the housing (3), in particular on the housing (3).

14 Claims, 3 Drawing Sheets

(51) Int. Cl.
*G01S 7/03* (2006.01)
*H01Q 1/32* (2006.01)
*B29C 45/00* (2006.01)
B29K 105/16 (2006.01)
B29K 507/04 (2006.01)
B29L 31/00 (2006.01)
G01S 7/02 (2006.01)

(52) U.S. Cl.
CPC ......... *G01S 13/931* (2013.01); *H01Q 1/3233* (2013.01); *H01Q 17/00* (2013.01); *H01Q 17/008* (2013.01); *B29K 2105/16* (2013.01); *B29K 2507/04* (2013.01); *B29K 2995/0011* (2013.01); *B29L 2031/7278* (2013.01); *G01S 2007/027* (2013.01); *G01S 2013/9371* (2013.01); *G01S 2013/9389* (2013.01)

(58) Field of Classification Search
USPC .............................................. 342/1–4, 70–72
See application file for complete search history.

(56) References Cited

U.S. PATENT DOCUMENTS

| | | | | |
|---|---|---|---|---|
| 6,097,327 | A * | 8/2000 | Byquist | H01Q 1/28 342/1 |
| 6,111,551 | A * | 8/2000 | Schmidt | H01Q 1/42 156/254 |
| 6,496,138 | B1 * | 12/2002 | Honma | G01S 13/931 342/27 |
| 6,717,544 | B2 * | 4/2004 | Nagasaku | G01S 7/032 342/175 |
| 6,788,190 | B2 | 9/2004 | Bishop | |
| 6,937,184 | B2 * | 8/2005 | Fujieda | G01S 7/03 342/1 |
| 7,126,525 | B2 * | 10/2006 | Suzuki | G01S 7/03 342/1 |
| 7,408,500 | B2 * | 8/2008 | Shinoda | H01Q 1/3233 342/1 |
| 7,508,353 | B2 * | 3/2009 | Shingyoji | H01Q 1/3233 342/1 |
| 8,864,197 | B2 * | 10/2014 | Schneider | H01Q 1/3233 293/117 |
| 2002/0067305 | A1 * | 6/2002 | LeBlanc | B60K 31/0008 342/198 |
| 2004/0036645 | A1 * | 2/2004 | Fujieda | G01S 7/03 342/70 |
| 2004/0227663 | A1 * | 11/2004 | Suzuki | G01S 7/03 342/70 |
| 2004/0239578 | A1 * | 12/2004 | Aisenbrey | B29C 70/58 343/872 |
| 2005/0001757 | A1 * | 1/2005 | Shinoda | H01Q 1/3233 342/70 |
| 2005/0110673 | A1 * | 5/2005 | Izumi | G01S 7/03 342/70 |
| 2005/0128134 | A1 * | 6/2005 | Shinoda | H01Q 1/3233 342/70 |
| 2005/0168374 | A1 * | 8/2005 | Kamiya | B60R 11/02 342/1 |
| 2006/0128895 | A1 * | 6/2006 | Aisenbrey | H01B 1/24 525/185 |
| 2006/0170583 | A1 * | 8/2006 | Marin Palacios | H01Q 17/002 342/1 |
| 2006/0238404 | A1 * | 10/2006 | Ikeda | G01S 7/032 342/70 |
| 2007/0040735 | A1 * | 2/2007 | Matsuo | H01L 23/552 342/175 |
| 2007/0241962 | A1 * | 10/2007 | Shinoda | G01S 7/032 342/361 |
| 2009/0128393 | A1 * | 5/2009 | Stjernman | H01Q 1/287 342/4 |
| 2009/0135042 | A1 * | 5/2009 | Umishita | B82Y 30/00 342/1 |
| 2010/0149018 | A1 * | 6/2010 | Umishita | H05K 9/009 342/1 |
| 2010/0271253 | A1 * | 10/2010 | Shah | H01B 1/18 342/2 |
| 2013/0120959 | A1 * | 5/2013 | Wano | H05K 9/0081 361/818 |
| 2013/0141269 | A1 * | 6/2013 | Schneider | H01Q 1/3233 342/70 |
| 2016/0023624 | A1 * | 1/2016 | Schaaf | B60R 19/03 293/117 |

FOREIGN PATENT DOCUMENTS

| | | |
|---|---|---|
| DE | 60 2004 000 722 T2 | 9/2007 |
| DE | 603 18 123 T2 | 11/2008 |
| DE | 10 2009 042 285 A1 | 3/2011 |
| DE | 10 2010 034 073 A1 | 2/2012 |

OTHER PUBLICATIONS

Search Report for corresponding German Application No. 10 2011 122 346.4, mailed Feb. 3, 2012 (5 pages).

* cited by examiner

RADAR DEVICE FOR A MOTOR VEHICLE, SECURING DEVICE FOR A RADAR APPARATUS AND METHOD FOR MANUFACTURING AN ABSORPTION ELEMENT FOR A RADAR APPARATUS

The invention relates to a radar device for a motor vehicle, which radar device has a radar apparatus for emitting and receiving electromagnetic waves and at least one absorption element, which is formed from an absorption material which absorbs the electromagnetic waves. The invention also relates to a securing device for a radar apparatus of a motor vehicle, which securing device is designed to attach the radar apparatus to a vehicle component, and also to a method for manufacturing an absorption element for a radar apparatus of a motor vehicle.

Radar apparatuses for motor vehicles are already prior art. The focus here is preferably on such a radar apparatus which is operated at a frequency of 24 GHz. Radar apparatuses serve to detect vehicle-external objects and provide the driver with a wide variety of information about the detected object, for example information about the distance, about the relative speed as well as about the so-called target angle, that is to say an angle between a connecting line connecting the object to the radar apparatus and a reference line (for example the longitudinal axis of the vehicle). Such radar apparatuses are usually located behind the bumper, specifically, for example, in the centre behind the rear bumper or else in the rear corner regions of the motor vehicle. In order to detect the object, the radar apparatus transmits electromagnetic waves, which are then reflected at the object to be detected and arrive back at the radar apparatus in the form of a radar echo. The received waves can then be evaluated with respect to the abovementioned information.

The radar apparatus sensors in the horizontal direction a relatively wide angular range which can even be 150°. The radar apparatus therefore has a relatively large azimuth angle, with the result that the detection range of the radar apparatus is relatively wide in the azimuth direction. In particular with such radar apparatuses it is problematic that the emitted electromagnetic waves are reflected at metallic objects, and even at non-metallic objects. In this context, particularly metallic objects or structures in the region behind the radar apparatus are problematic. The high-frequency reflections at metallic structures of the motor vehicle cause interference at the radar apparatus and the measured values can be falsified. The prior art already includes minimizing this interference by means of an absorption element which absorbs the high-frequency electromagnetic waves. For example, document U.S. Pat. No. 7,408,500 B2 has already disclosed a radar apparatus in which such an absorption element is mounted on a substrate on which the antenna structures are also arranged. It is to be considered a disadvantage of this prior art that, as a result of the arrangement of the absorption element on the substrate, additional installation space is required in the radar apparatus and the radar apparatus itself can therefore no longer be constructed in a compact fashion. Furthermore, subsequent retrofitting of already existing radar apparatuses with such an absorption element is not possible or is possible only with relatively high expenditure. For example, already existing radar apparatuses would have to be reconfigured in a costly fashion and in the case of already existing radar apparatuses the absorption element would have to be mounted on the printed circuit board.

A radar device of the generic type can also be considered to be known from document U.S. Pat. No. 6,788,190 B2. Here, the absorption element is also arranged in a housing of the radar apparatus and a receiver of the radar apparatus is screened in the lateral outward direction by the absorption element. In the subject matter according to document U.S. Pat. No. 6,788,190 B2 the radar apparatus itself must also be constructed in a correspondingly larger fashion and subsequent retrofitting with an absorption element is only possible with relatively large expenditure.

The object of the invention is to specify a solution as to how in the case of a radar device of the generic type mentioned at the beginning the radar apparatus itself can be constructed in a particularly compact fashion and at the same time the satisfactory method of functioning of the radar apparatus can also be ensured using the absorption element.

This object is achieved according to the invention by means of a radar device, a securing device and also a method having the features according to the respective independent patent claims. Advantageous embodiments of the invention are the subject of dependent patent claims, the description and the figures.

A radar device according to the invention for a motor vehicle includes a radar apparatus which is designed to emit and receive electromagnetic waves, as well as at least one absorption element, which is formed from an absorption material (radar absorptive material, RAM) which absorbs the electromagnetic waves. According to the invention there is provision that the at least one absorption element is embodied as an element which is separate from a housing of the radar apparatus and is arranged outside the housing, specifically in particular on the housing.

The invention therefore adopts the approach of configuring the absorption element as a separate component which is arranged outside the radar housing, in which, for example, the transmitter and receiver are arranged. The radar apparatus itself can therefore be constructed in a particularly compact fashion because there is no need to insert any absorption elements into the housing. Furthermore, already existing radar apparatuses can subsequently be retrofitted with an absorption element; for this purpose all that is necessary is to make available such an absorption element and arrange it on the housing. On the other hand, there is also more installation space available for other electronic components of the radar apparatus in the housing of the radar apparatus.

It proves advantageous if the at least one absorption element is embodied as a securing device by means of which the radar apparatus can be attached to a vehicle component. The absorption element therefore assumes two different functions: on the one hand the function of absorbing the electromagnetic waves and on the other hand also the function of securing the radar apparatus. It is therefore possible to achieve savings in terms of components and also in terms of the valuable installation space.

The at least one absorption element is particularly preferably arranged around the housing of the radar apparatus, with the result that the absorption element surrounds the housing of the radar apparatus on the outer circumference. In particular, in this embodiment the absorption element bears against all the side walls of the housing, with the result that the side walls of the housing are encased by the absorption element. This can take the form of exclusively one front side, via which the electromagnetic waves are emitted and received, and, if appropriate, also a rear side of the radar apparatus lying opposite the front side being free of the absorption element, with the result that the electromagnetic waves can propagate unimpeded through the front side of the housing. The arrangement of the absorption element around the housing has the advantage that any waves which are reflected laterally next to the radar apparatus, for example at the vehicle bodywork, are absorbed by the absorption element and therefore cannot influence the measurement with the radar apparatus. Furthermore, it is therefore possible, in particular if the absorption element is embodied as a securing device, to ensure a particularly secure seat of the radar apparatus and therefore a particularly stable arrangement of the radar apparatus.

In one embodiment, the housing of the radar apparatus is plugged into the absorption element. For this purpose, it is possible to provide, for example, a latching device by means of which the housing of the radar apparatus is connected to the absorption element. Such a latching device can have at least one sprung latching element, on the one hand, and a corresponding latching opening, on the other. The radar apparatus can therefore be connected to the absorption element without much expenditure either, specifically with just one hand. Furthermore, the connection between the absorption element and the housing can therefore be released again, specifically, for example, when the radar apparatus is removed from the motor vehicle again and has to be examined, for example. In order to accommodate the housing of the radar apparatus, the absorption element preferably has a receptacle in which the housing is held and can be latched in there.

The at least one absorption element can also be of plate-shaped design and extend parallel to the front side of the housing, via which front side the electromagnetic waves are emitted and received. The absorption element can therefore have a plate-shaped element in this case which extends parallel to the front side of the housing. This plate-shaped element can also have a continuous cutout, in which the housing can be received. Perpendicular wall elements can adjoin the plate-shaped element which extends, as it were, in the form of a wing parallel to the front side of the housing, said wall elements bordering the cutout and surrounding the housing of the radar apparatus. The plate-shaped element therefore extends parallel to the front side, and in particular also in the plane of the front side of the housing, while the wall elements of the absorption element which protrude perpendicularly therefrom in a plate shape can bear against the side walls of the housing and therefore can enclose the housing on its outer circumference. The radar apparatus is therefore protected or screened particularly reliably and effectively against waves reflected at bodywork components.

Alternatively, the at least one absorption element can be embodied in an arcuate shape in cross section and have two lateral wings which extend outwards from the housing in opposite directions and are embodied in a curved fashion in a direction opposite the emission direction of the radar apparatus. The absorption element is therefore of bulbous design, with the result that the lateral screening of the radar apparatus is particularly effective and reliable. The lateral wings namely protect the side walls of the radar apparatus against undesired radiation and ensure the satisfactory functioning of the radar apparatus.

It is preferred here if, in the direction opposite the emission direction, that is to say toward the rear, the wings protrude beyond the housing of the radar apparatus or extend over a rear side of the housing. This means that the wings project beyond the housing of the radar apparatus. The radar apparatus is therefore particularly well protected against undesired reflections.

The plate-shaped or arcuate absorption element can also terminate flush with the front side of the housing. On the one hand, the undesired waves can therefore be absorbed, and on the other hand the satisfactory operation of the radar apparatus is not adversely affected and the detection angle of the radar apparatus remains unchanged.

In one embodiment there is provision that the absorption element comprises a wave-absorbing plate or else is formed thereby, which plate is provided on a rear side of the housing of the radar apparatus lying opposite the front side. With this plate it is also possible to completely cover the rear side of the housing. This has the advantage that those waves which are reflected at the bodywork parts of the motor vehicle behind the radar apparatus can also be absorbed.

It proves particularly advantageous if the absorption element is embodied as a cast component. The absorption element can therefore be manufactured without much expenditure and the absorption element can have a wide variety of shapes and can therefore be adapted correspondingly to the shape of the housing of the radar apparatus.

The absorption material (RAM) can be a wave-absorbing plastic. The absorption element can therefore be injection moulded.

The invention also relates to a securing device for a radar apparatus of a motor vehicle which is designed to attach the radar apparatus to a vehicle component. The securing device is formed at least in certain areas from an absorption material which absorbs electromagnetic waves.

A method according to the invention serves to manufacture an absorption element for a radar apparatus of a motor vehicle, wherein electromagnetic waves are absorbed by the absorption element. The absorption element is manufactured by injection moulding. It is therefore possible to manufacture the absorption element without much expenditure and also configure it with a wide variety of shapes and adapt it correspondingly to the geometric shape of the housing of the radar apparatus.

The method preferably includes the following steps:
a) making available a plastic material for the injection moulding,
b) adding a wave-absorbing material to the plastic material with the result that a mixed material is made available, and
c) manufacturing the absorption element by injection moulding from the mixed material.

Mixing the plastic material with the wave-absorbing material ensures that, on the one hand, the absorption element can be manufactured by injection moulding and, on the other hand, it also has the property of absorbing the electromagnetic waves.

In order to absorb the waves effectively it is possible to provide that in step b) graphite is added, as a wave-absorbing material, to the plastic material.

The invention also relates to a motor vehicle having a radar device according to the invention.

The preferred embodiments presented with respect to the radar device according to the invention, and the advantages thereof, apply correspondingly to the securing device according to the invention, to the method according to the invention and to the motor vehicle, and vice versa.

Further features of the invention can be found in the claims, the figures and the description of the figures. All the features and feature combinations mentioned above in the description as well as the features and feature combinations which are mentioned below in the description of the figures and/or shown alone in the figures can be used not only in the respectively specified combination but also in other combinations or else alone.

The invention will now be explained in more detail on the basis of a preferred exemplary embodiment and also with reference to the appended drawings, of which:

Figure 1:
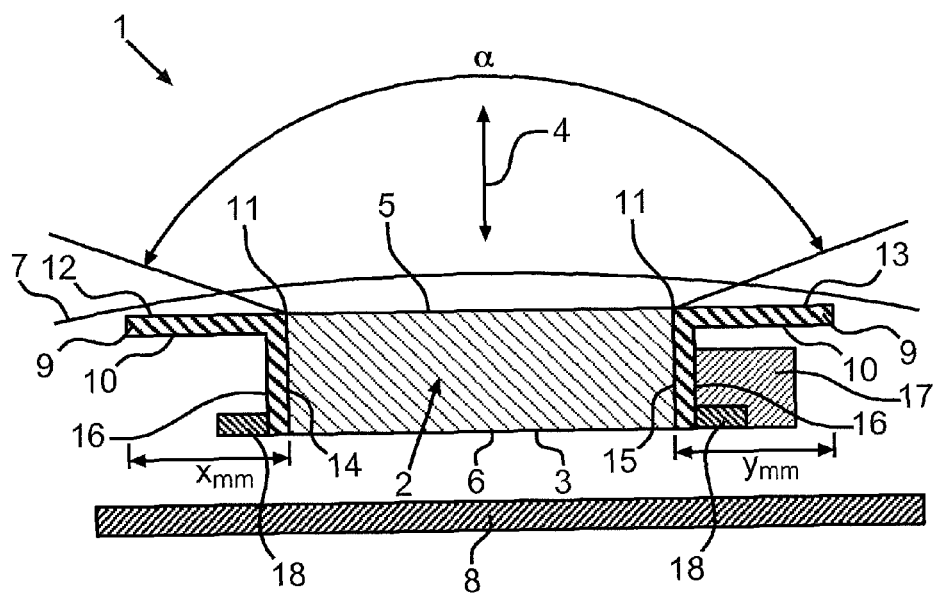
FIG. 1 is a schematic illustration of a cross section through a radar device according to an embodiment of the invention.

A radar device 1 (illustrated in FIG. 1) for a motor vehicle serves to detect vehicle-external objects which are located in the surroundings of the motor vehicle. The radar device 1 serves, for example, to determine a distance between the object and the motor vehicle, a relative speed between the motor vehicle and the object and a target angle, that is to say the relative position of the object with respect to the motor vehicle. The radar device 1 has a radar apparatus 2 which has a housing 3 in which the essential components of the radar apparatus 2 are accommodated, that is to say, in particular, the transmitter and receiver. The radar apparatus 2 is designed to emit and receive electromagnetic waves 4, as is indicated schematically in FIG. 1 with an arrow illustration. The radar apparatus 2 is preferably operated here at a frequency of 24 GHz; this means that the waves 4 are generated with a frequency of 24 GHz. In this context, the specified frequency is the centre frequency, and of course the frequency spectrum of the waves 4 can also have a specific bandwidth, specifically, for example, 100 MHz or 200 MHz or the like.

The radar apparatus 2 has a front side 5 through which the electromagnetic waves 4 are received and emitted. The radar apparatus 2 has here a relatively wide detection angle α, which can be, for example, in a value range from 100° to 180°. The angle α is, for example, 150°. The invention is, however, not limited to a specific angle α.

The detection angle α is measured here in the horizontal direction and therefore constitutes the azimuth angle of the radar apparatus 2. This means that the detection range of the radar apparatus 2 or the surroundings of the motor vehicle is/are sensed in the horizontal direction within the detection angle α.

The radar apparatus 2, to be more precise the housing 3, has a rear side 6 which is located opposite the front side 5 and which faces the interior of the motor vehicle. In this context, the radar apparatus 2 is located behind a bumper 7, specifically, in particular, a rear bumper 7 of the motor vehicle. The radar apparatus 2 can, for example, be arranged centrally, that is to say in the centre of the bumper 7, or else in a corner region of the bumper 7. The rear side 6 faces a bodywork component 8 which is constructed from a metallic material and is located behind the radar apparatus 2.

The radar device 1 also has an absorption element 9 which is designed to absorb the electromagnetic waves 4 in the region of the frequency of 24 GHz. The absorption element 9 is formed from a wave-absorbing material (RAM). It is a cast component which is manufactured by injection moulding. In this context, a plastic material is mixed with a wave-absorbing material, for example graphite, and the absorption element 9 is then manufactured from this mixture by injection moulding.

As is apparent from the cross section according to FIG. 1, the absorption element 9 has a plate-like or plate-shaped element 10 which extends in the plane of the front side 5 and terminates flush with the front side 5. In the plate-shaped element 10 a continuous cutout 11 is formed for the housing 3 of the radar apparatus 2, in which cutout 11 the radar apparatus 2 is held. The cutout 11 therefore constitutes a receptacle for the radar apparatus 2 into which the radar apparatus 2 can be plugged. In this context, the front side 5 of the housing 3 is arranged flush with the surface of the element 10. Two lateral wings 12, 13 are therefore formed by this cutout 11, and the element 10 is divided into two wings 12, 13. The first wing 12 adjoins here a side wall 14 of the housing 3, while the second wing 13 adjoins an opposite side wall 15 of the housing 3.

The cutout 11 or the receptacle for the radar apparatus 2 is bounded laterally by wall elements 16 of the absorption element 9. The wall elements 16 extend perpendicularly to the plate-shaped element 10 and bear against the side walls 14, 15 of the housing 3. The housing 3 of the radar apparatus 2 is therefore surrounded or encased on the outer circumference by the wall elements 16, with the result that only the front side 5 and the rear side 6 are free of the wave-absorbing absorption element 9.

The housing 3 also has an electric terminal 17 by means of which the radar apparatus 2 can be connected to a control device of the motor vehicle.

Furthermore, attachment elements 18, which serve to attach the radar apparatus 2 to a vehicle component, are provided on the housing 3. Two different embodiments can be provided here: on the one hand the radar apparatus 2 can be attached to the vehicle component via the housing 3 or by means of the attachment elements 18, and the absorption element 9 which is formed in one piece can then be plugged onto the housing 3. However, the absorption element 9 can alternatively serve as a securing device by means of which the radar apparatus 2 is attached to the vehicle component. In this context, the absorption element 9 can firstly be positioned on the vehicle component and connected thereto; and the radar apparatus 2 can subsequently be plugged into the absorption element 9. The radar apparatus 2 is secured here exclusively using the absorption element 9.

The absorption element 9 can therefore be a securing device for the radar apparatus 2, with the result that the absorption element 9 is designed to attach the radar apparatus 2 to a vehicle component.

The length of the two wings 12, 13 can be different or the same. As is apparent from FIG. 1, the length of the first wing 12 can be x mm in the azimuth direction, while the length of the second wing 13 can be y mm in the azimuth direction. However, the two numbers x and y can also be the same.

Figure 2:
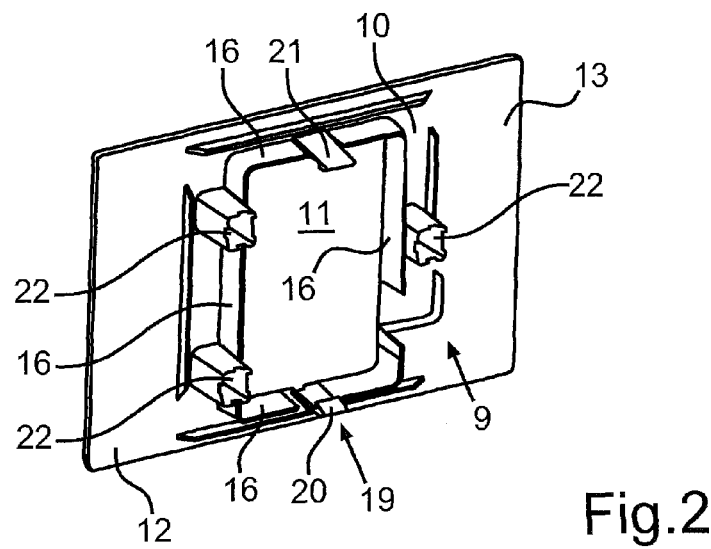
FIG. 2 is a schematic and perspective illustration of an absorption element of the radar device according to FIG. 1.
Figure 3:
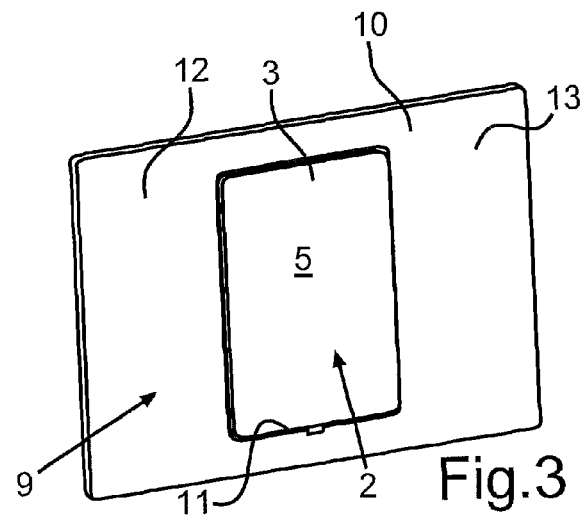
FIG. 3 is a schematic and perspective illustration of the radar device according to FIG. 1.

FIGS. 2 and 3 show the absorption element 9 in a perspective illustration. While FIG. 2 shows the rear side of the absorption element 9, FIG. 3 shows the front side 5 of the radar apparatus 2 and the front side of the absorption element 9. As is apparent from FIGS. 2 and 3, the element 10 is embodied in the form of a rectangular plate in which the cutout 11 (also rectangular) is formed. The radar apparatus 2 can be plugged into the cutout 11, which forms a receptacle for the radar apparatus 2, and the absorption element 9 can be plugged onto the radar apparatus 2. In order to attach or connect the housing 3 to the absorption element 9, a latching device 19 is provided which, in the exemplary embodiment, has two latching noses 20, 21, on the one hand, and corresponding latching openings, on the other. The latching noses 21, 20 are provided here on the rear side of the absorption element 9, and the corresponding latching openings (not illustrated) are formed on the housing 3. As is also apparent from FIG. 2, the wall elements 16 protrude perpendicularly from the element 10. In this context wall elements 16 are provided in total on all four sides of the housing 3 and together form a mount for the radar apparatus 2 with which the housing 3 is enclosed. The latching elements 20, 21 are integrated into this mount here.

Through-openings 22 can be made available for attaching the absorption element 9 to the vehicle component.

As is apparent, in particular, from FIG. 3, the front side 5 of the housing 3 terminates flush with the surface or front side of the absorption element 9. The absorption element 9 therefore lies around the outer circumference around the housing 3 and surrounds the side walls 14, 15 of the housing 3. The two wings 12, 13 extend laterally outwards, specifically in the azimuth direction of the radar apparatus 2. In other words, the two wings 12, 13 protrude in the outwards direction.

Figure 4:
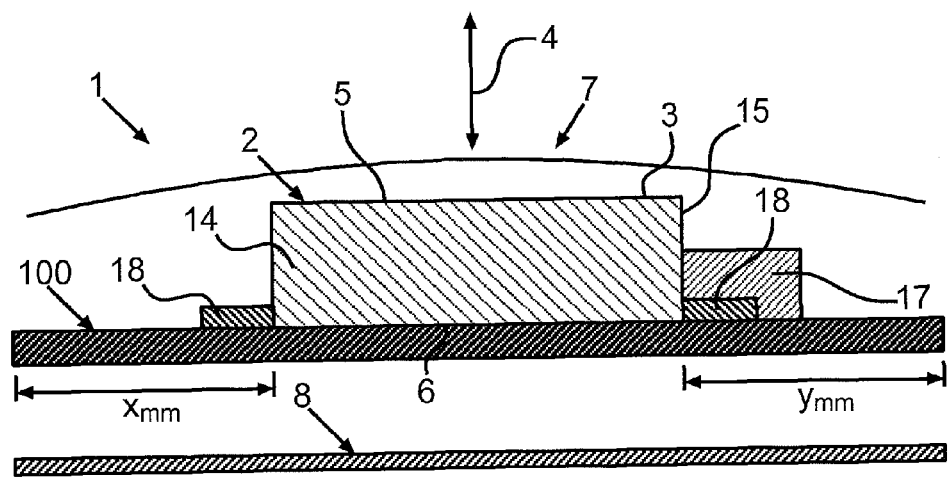
FIG. 4 is a schematic illustration of a cross section through a radar device according to a further embodiment of the invention.

In FIG. 4, the radar device 1 according to a further embodiment is illustrated. The only difference is that the absorption element 100 is formed by a plate which is formed from the wave-absorbing material. This absorption element 100 is provided on the rear side 6 of the housing 3 and therefore bears against the rear side 6. The absorption element 100 is longer here than the housing 3 and extends in the azimuth direction beyond the housing 3 on both the left-hand and right-hand sides, specifically by x mm, on the one hand, and y mm, on the other. The radar apparatus 2 is therefore also screened against waves which are reflected behind the radar apparatus 2, for example at the vehicle body component 8.

Figure 5:
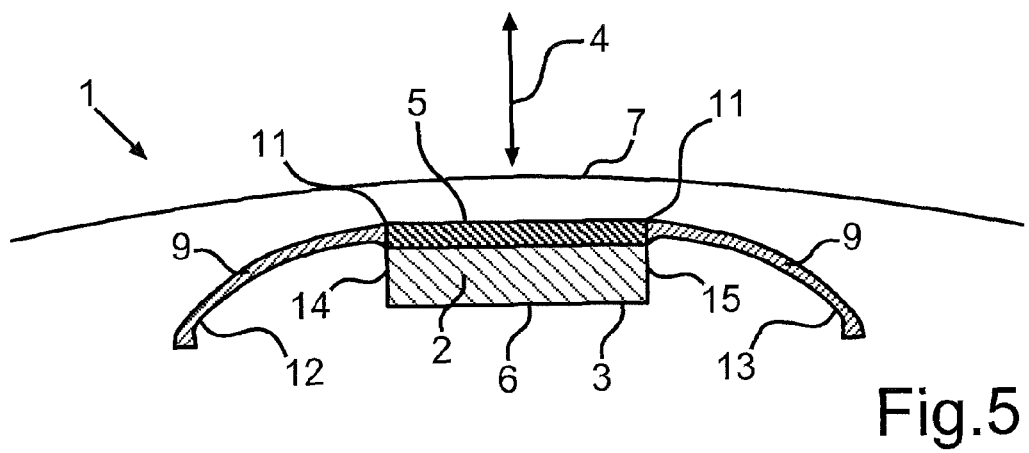
FIG. 5 is a schematic illustration of a cross section through a radar device according to a further embodiment of the invention.

The embodiment according to FIG. 4 can be combined with that according to FIG. 1 or FIG. 5, of course, and the radar device 1 can have both absorption elements 9, 100. However, it is also possible to use just one of the two absorption elements 9, 100.

A further embodiment is illustrated in FIG. 5. Here, FIG. 5 illustrates a cross section through the radar device 1, which corresponds essentially to the radar device according to FIGS. 1 to 3, but with the difference that the absorption element 9 is of arcuate or bulbous design. The absorption element has here a curvature with the result that the two wings 12, 13 which protrude outwards in opposite directions are curved rearwards, specifically in a direction opposing the emission direction 4 of the radar apparatus 2 (in the direction towards the interior of the motor vehicle). In this context, the wings 12, 13 also project beyond the housing 3 or extend even further beyond the housing 3 in the direction opposite to the emission direction. An arcuate lateral screen is therefore provided by means of which the radar apparatus 2 can be particularly reliably protected from lateral reflections. For the sake of clarity, the wall elements 16 are not shown in FIG. 5; however, they can also be provided in the embodiment according to FIG. 5, with the result that the arrangement of the housing 3 on the absorption element 9 is the same as in the case of the embodiment according to FIG. 1.

The invention claimed is:
1. A radar device for a motor vehicle, comprising:
a radar apparatus for emitting and receiving electromagnetic waves, the radar apparatus including at least one absorption element, which is formed from an absorption material which absorbs the electromagnetic waves,
wherein the at least one absorption element is embodied as an element which is separate from a housing of the radar apparatus and is arranged on the housing,
wherein the at least one absorption element is embodied in an arcuate shape in cross section and has two wings which extend outwards from the housing in opposite directions and are embodied in a curved fashion in a direction counter to an emission direction of the radar apparatus, and
wherein the at least one absorption element terminates flush with a front side of the housing, via which front side the electromagnetic waves are emitted.

2. The radar device according to claim 1, wherein the at least one absorption element is a securing device by which the radar apparatus is attached to a vehicle component.

3. The radar device according to claim 1, wherein the at least one absorption element is arranged around the housing of the radar apparatus, with the result that the absorption element surrounds the housing on the outer circumference.

4. The radar device according to claim 1, wherein the housing is plugged into the absorption element.

5. A radar device for a motor vehicle, comprising:
a radar apparatus for emitting and receiving electromagnetic waves, the radar apparatus including at least one absorption element, which is formed from an absorption material which absorbs the electromagnetic waves,
wherein at least one absorption element is embodiment as an element which is separate from a housing of the radar apparatus and is arranged on the housing,
wherein the at least one absorption element is of plate-shaped design and extends parallel to a front side of the housing of the radar apparatus, via which front side the electromagnetic waves are emitted, and
wherein the at least one absorption element terminates flush with a front side of the housing, via which front side the electromagnetic waves are emitted.

6. The radar device according to claim 1, wherein in the direction opposite the emission direction, the wings protrude beyond the housing of the radar apparatus.

7. A radar device for a motor vehicle, comprising:
a radar apparatus for emitting and receiving electromagnetic waves, the radar apparatus including at least one absorption element, which is formed from an absorption material which absorbs the electromagnetic waves,
wherein the at least one absorption element is embodied as an element which is separate from a housing of the radar apparatus and is arranged on the housing,
wherein the at least one absorption element comprises a plate or is formed thereby, which plate is provided on a rear side of the housing of the radar apparatus, and
wherein the rear side of the housing of the radar apparatus is a direction opposite to an emission direction of the radar apparatus.

8. The radar device according to claim 1, wherein the at least one absorption element is a cast component.

9. The radar device according to claim 1, wherein the absorption material is a wave-absorbing plastic.

10. A securing device for a radar apparatus of a motor vehicle,
wherein the securing device is configured to attach the radar apparatus to a vehicle component,
wherein the securing device is formed at least in certain areas from an absorption material which absorbs electromagnetic waves, and
wherein the absorption material comprises at least one absorption element that terminates flush with a front side of a housing of the radar apparatus, via which front side the electromagnetic waves are emitted.

11. A method for manufacturing an absorption element for a radar apparatus of a motor vehicle, comprising:
manufacturing the absorption element by injection moulding, wherein electromagnetic waves are absorbed by the absorption elements,
wherein the absorption element is molded such that it is configured to terminate flush with a front side of a housing of a radar apparatus, via which front side the electromagnetic waves are emitted.

12. The method according to claim 11, wherein the absorption element is manufactured as a securing device for attaching the radar apparatus to a vehicle component.

13. The method according to claim 11, further comprising:
making available a plastic material for the injection moulding;
adding a wave-absorbing material to the plastic material to make available a mixed material; and
manufacturing the absorption element by injection moulding from the mixed material.

14. The method according to claim 12, wherein graphite is added, as a wave-absorbing material, to the plastic material.

* * * * *